United States Patent
Heaton et al.

(10) Patent No.: US 11,193,538 B2
(45) Date of Patent: Dec. 7, 2021

(54) BEARING CAGE ASSEMBLY INCLUDING STIFFENING RING

(71) Applicant: Schaeffler Technologies AG & Co. KG, Herzogenaurach (DE)

(72) Inventors: Michael Heaton, Rock Hill, SC (US); Dennis Roffe, Fort Mill, SC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/813,272

(22) Filed: Mar. 9, 2020

(65) Prior Publication Data

US 2021/0277947 A1    Sep. 9, 2021

(51) Int. Cl.
| | |
|---|---|
| *F16C 19/06* | (2006.01) |
| *F16C 33/38* | (2006.01) |
| *F16C 33/41* | (2006.01) |
| *F16C 33/46* | (2006.01) |
| *B21D 53/12* | (2006.01) |

(52) U.S. Cl.
CPC .......... *F16C 33/3887* (2013.01); *F16C 19/06* (2013.01); *F16C 33/3831* (2013.01); *F16C 33/3856* (2013.01); *F16C 33/418* (2013.01); *F16C 33/4623* (2013.01); *B21D 53/12* (2013.01)

(58) Field of Classification Search
CPC .. F16C 19/06; F16C 33/3831; F16C 33/3856; F16C 33/3887; F16C 33/418; F16C 33/4611; F16C 33/4623; B21D 53/12
USPC ............ 385/526, 531, 533–534; 29/898.064; 384/539
See application file for complete search history.

(56) References Cited

U.S. PATENT DOCUMENTS

| | | | | |
|---|---|---|---|---|
| 1,013,518 | A * | 1/1912 | Schilling | F16C 33/3862 384/526 |
| 6,666,585 | B1 * | 12/2003 | Kotzalas | F16C 33/4611 384/578 |
| 7,364,365 | B2 * | 4/2008 | Begin | F16C 33/3831 384/530 |
| 8,794,845 | B2 * | 8/2014 | Beck | B21D 53/12 384/573 |
| 10,527,095 | B1 * | 1/2020 | Roffe | F16C 33/3862 |
| 10,697,497 | B1 * | 6/2020 | Roffe | F16C 33/412 |

(Continued)

FOREIGN PATENT DOCUMENTS

| | | | | |
|---|---|---|---|---|
| CN | 108035966 A | * | 5/2018 | .............. F16C 33/38 |
| CN | 209510918 U | * | 10/2019 | .............. F16C 33/30 |
| DE | 4112506 A | * | 10/1992 | .......... F16C 33/4611 |

(Continued)

OTHER PUBLICATIONS

U.S. Appl. No. 16/751,917, filed Jan. 24, 2020 (unpublished).

*Primary Examiner* — Marcus Charles
(74) *Attorney, Agent, or Firm* — Volpe Koenig

(57) ABSTRACT

A bearing cage assembly is disclosed. The assembly includes a stiffening ring formed from a first material, and a cage formed from a second material that is different than the first material. The cage includes a plurality of arms extending axially away from a base rim. The plurality of arms define a plurality of rolling element pockets therebetween. Each of the plurality of arms defines a slot dimensioned to receive a portion of the stiffening ring, such that the stiffening ring is secured to the cage via engagement within the slots of the plurality of arms.

17 Claims, 4 Drawing Sheets

(56) References Cited

U.S. PATENT DOCUMENTS

2014/0105531 A1* 4/2014 Varnoux .............. F16C 33/416
                                                          384/531

FOREIGN PATENT DOCUMENTS

| DE | 202010015674 U1 | * | 4/2011 | ............ F16C 33/416 |
| DE | 102011080167 A1 | * | 2/2013 | .......... F16C 33/4664 |
| JP | H09242759 A | * | 9/1997 | .......... F16C 33/4611 |
| JP | 2003254342 A | * | 9/2003 | ............ F16C 33/445 |
| JP | 2007285506 A | * | 11/2007 | .......... F16C 33/3862 |
| JP | 2016023730 A | * | 2/2016 | ............... F16C 19/06 |

* cited by examiner

BEARING CAGE ASSEMBLY INCLUDING STIFFENING RING

FIELD OF INVENTION

The present disclosure relates to bearing cage assembly for high speed applications.

BACKGROUND

There is an increasing demand to provide fuel efficient and environmentally friendly and compliant automotive drive systems. As a result, automotive drive systems are becoming increasingly reliant on electrical drive components and motors. This shift in market demand requires more bearings in order to support the high rotational speeds experienced by components in electric motors.

Bearing assemblies, such as deep groove ball bearing assemblies, generally require cages to support the ball bearings. However, traditional single piece cages experience issues due to the high speeds associated with electric motors. In order to accommodate the high speeds, cage designs are increasingly relying on a two-piece cage configuration. One type of two-piece cage is formed entirely from plastic, which is not suitable for the high rotational speeds (i.e. 50,000 rpm) experienced by electric motors. Existing two-piece plastic cages typically experience failure around 30,000 rpm and not able to withstand the performance demands of an electric motor.

It would be desirable to provide a light-weight, cost-effective, and reliable bearing cage that performs in a high speed application.

SUMMARY

A bearing cage assembly is disclosed herein that addresses the issues with using a bearing cage in high-speed environments. The bearing cage assembly generally includes a stiffening ring formed from a first material, and a cage formed from a second material. The cage includes a plurality of arms extending axially away from a base rim. The plurality of arms define a plurality of rolling element pockets therebetween. Each of the plurality of arms defines a slot dimensioned to receive a portion of the stiffening ring, such that the stiffening ring is secured to the cage via engagement within the slots of the plurality of arms.

In one embodiment, the stiffening ring is formed from metal, and the cage is formed from plastic.

The stiffening ring has a uniformly flat profile in one embodiment. In one embodiment, the slots are defined on an axially outermost end face of the plurality of arms. The stiffening ring is held by the cage axially inside of the axially outermost end face of the plurality of arms. In one embodiment, the stiffening ring is secured to the slots of the plurality of arms via a snap fit.

In one embodiment, the slots are defined in a radially medial region of an axial end of the plurality of arms. The stiffening ring overlaps with a pitch diameter (P) of the bearing cage assembly.

The stiffening ring also partially defines the plurality of rolling element pockets to retain rolling elements within the rolling element pockets.

The plurality of arms can each include a pair of fingers extending radially towards each other, and fingers each engage the stiffening ring to provide a snap fit.

The base rim can also include recesses on a radially inner surface and a radially outer surface of the cage. The recesses can extend from an axial end of the cage opposite from an end of the cage defining the slots.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A bearing cage assembly 10 is shown in the FIGS. 1-4. The bearing cage assembly 10 includes a stiffening ring 30 formed from a first material, and a cage 20 formed from a second material. The ring 30 is snapped into an open end of the cage 20 to provide stiffness to reduce stresses and deflection.

Figure 4:
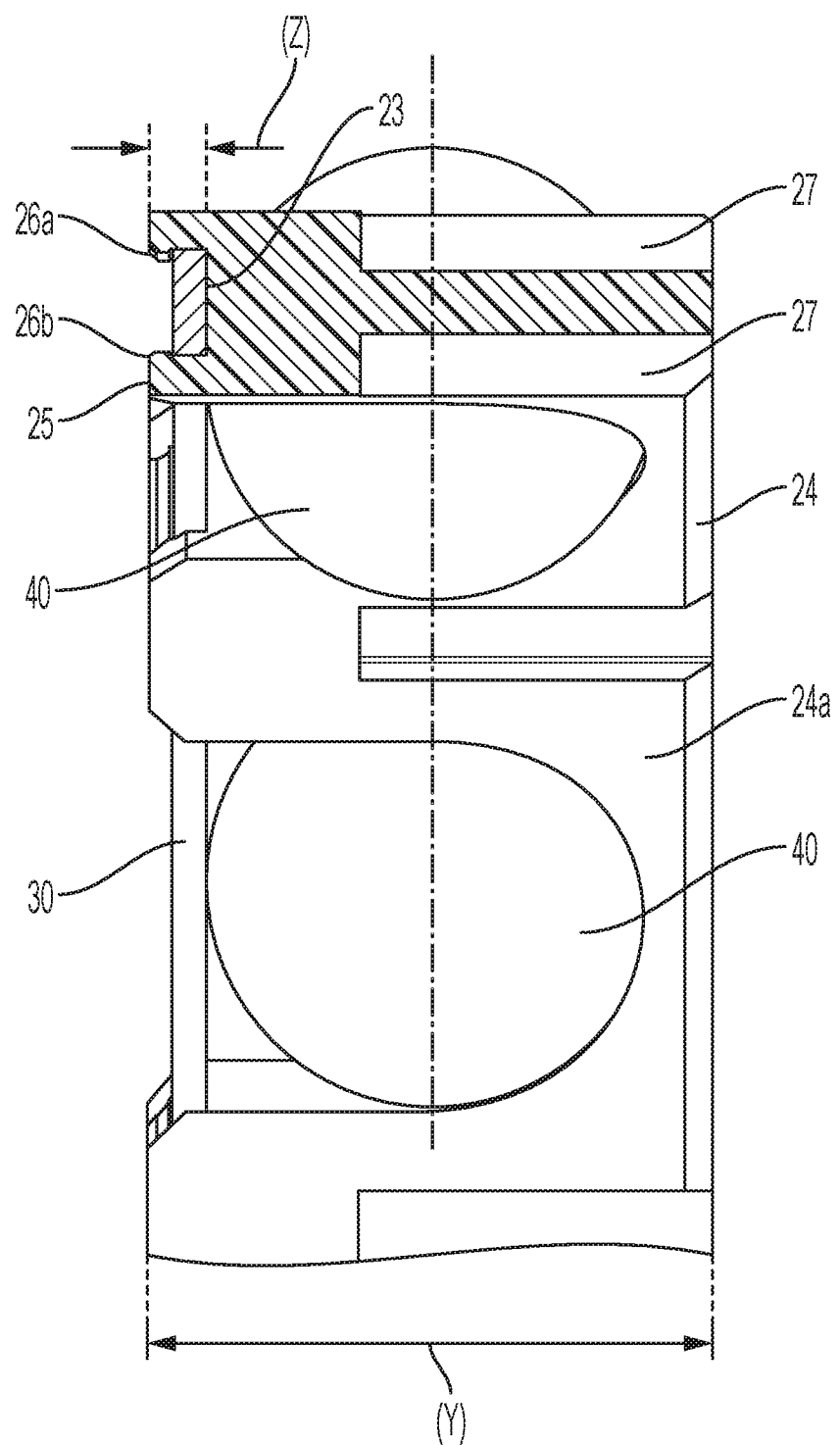
FIG. 4 is a partial cross-sectional view of the bearing cage assembly of FIG. 3 along line Iv-Iv.

The stiffening ring 30 is preferably formed from metal, and more specifically formed from steel. The stiffening ring 30 preferably has a uniformly flat profile. This configuration of the stiffening ring 30 is relatively simple and cost-effective to manufacture. As best shown in FIG. 4, the stiffening ring 30 preferably has a rectangular cross-section, in which the ring 30 has a greater radial extent than axial extent. One of ordinary skill in the art would understand based on this disclosure that the geometry and shape of the ring 30 can vary.

The cage 20 is preferably formed from plastic. In one embodiment, the cage 20 is formed from a high temperature polyamide. One of ordinary skill in the art would understand based on this disclosure that any cage material may be selected as long as it is compatible with the media surrounding the bear assembly and resists thermal creep. The cage 20 includes a plurality of arms 22 extending axially away from a base rim 24. A plurality of rolling element pockets 28 are defined between the plurality of arms 22 therebetween. As best shown in FIG. 4, the arms 22 extend axially beyond rolling elements 40 secured in the pockets 28.

Each arm 22 defines a slot 23 dimensioned to receive a portion of the stiffening ring 30, such that the stiffening ring 30 is secured to the cage 20 via engagement within the slots 23 of the plurality of arms 22. The stiffening ring 30 is preferably secured to the slots 23 of the plurality of arms 22 via a snap fit. This ensures a simplified assembly process in which the cage 20 and ring 30 can be assembled with each other manually and without any additional fastening components. One of ordinary skill in the art would understand that other types of connections besides a snap fit can be used.

The slots 23 generally extend in a curved manner in a circumferential manner. The slots 23 are defined on an axially outermost end face 25 of the plurality of arms 22. The stiffening ring 30 is held by the cage 20 axially inside of the axially outermost end face 25 of the plurality of arms 22. This configuration ensures that the stiffening ring 30 is relatively captively secured inside of the cage 20, and only one axial side of the stiffening ring 30 is exposed. All other sides of the stiffening ring 30 contact the cage 20.

Figure 1:
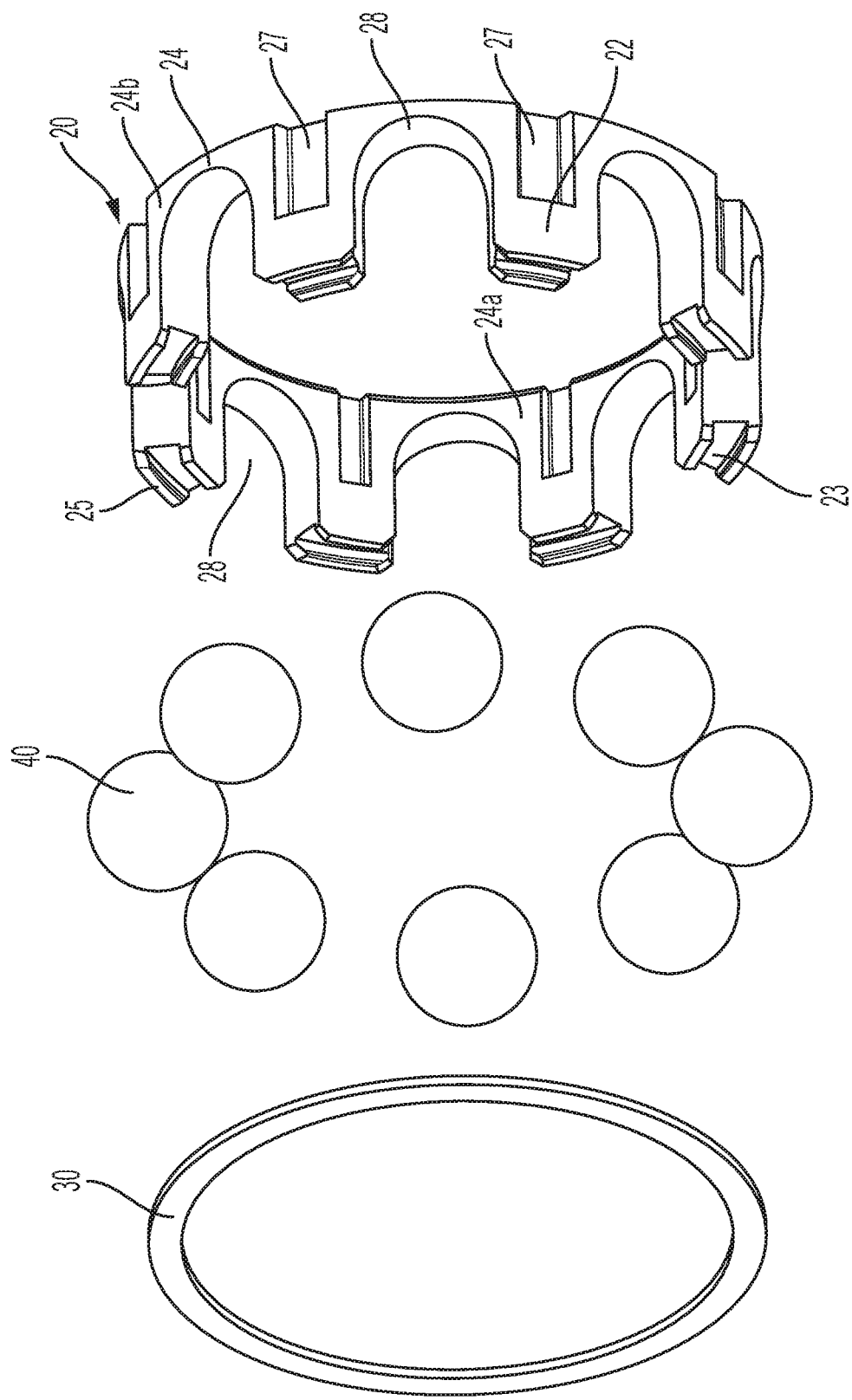
FIG. 1 is an exploded view of a bearing cage assembly according to an embodiment.
Figure 2:
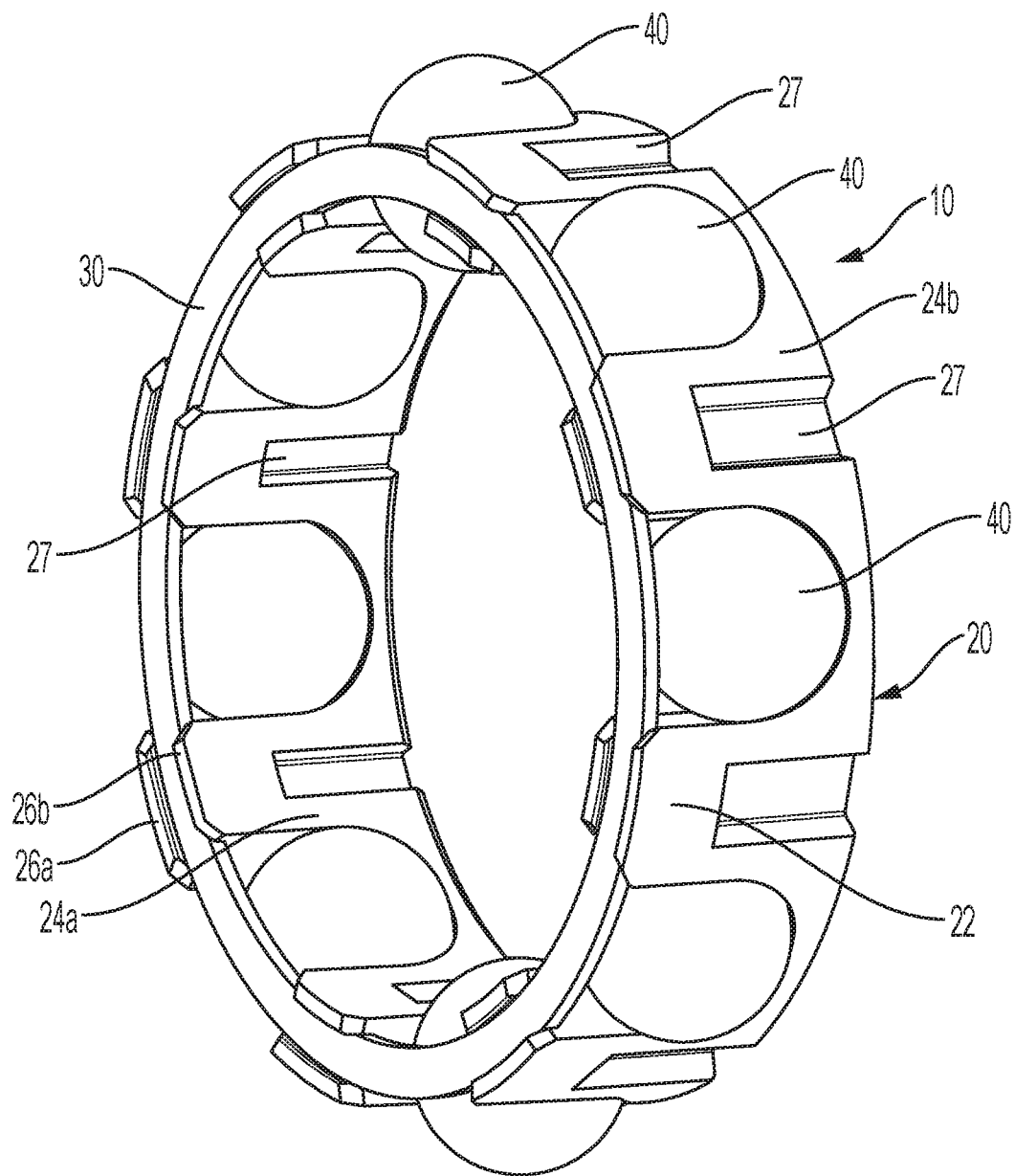
FIG. 2 is perspective view of the bearing cage assembly of FIG. 1 in an assembled state.
Figure 3:
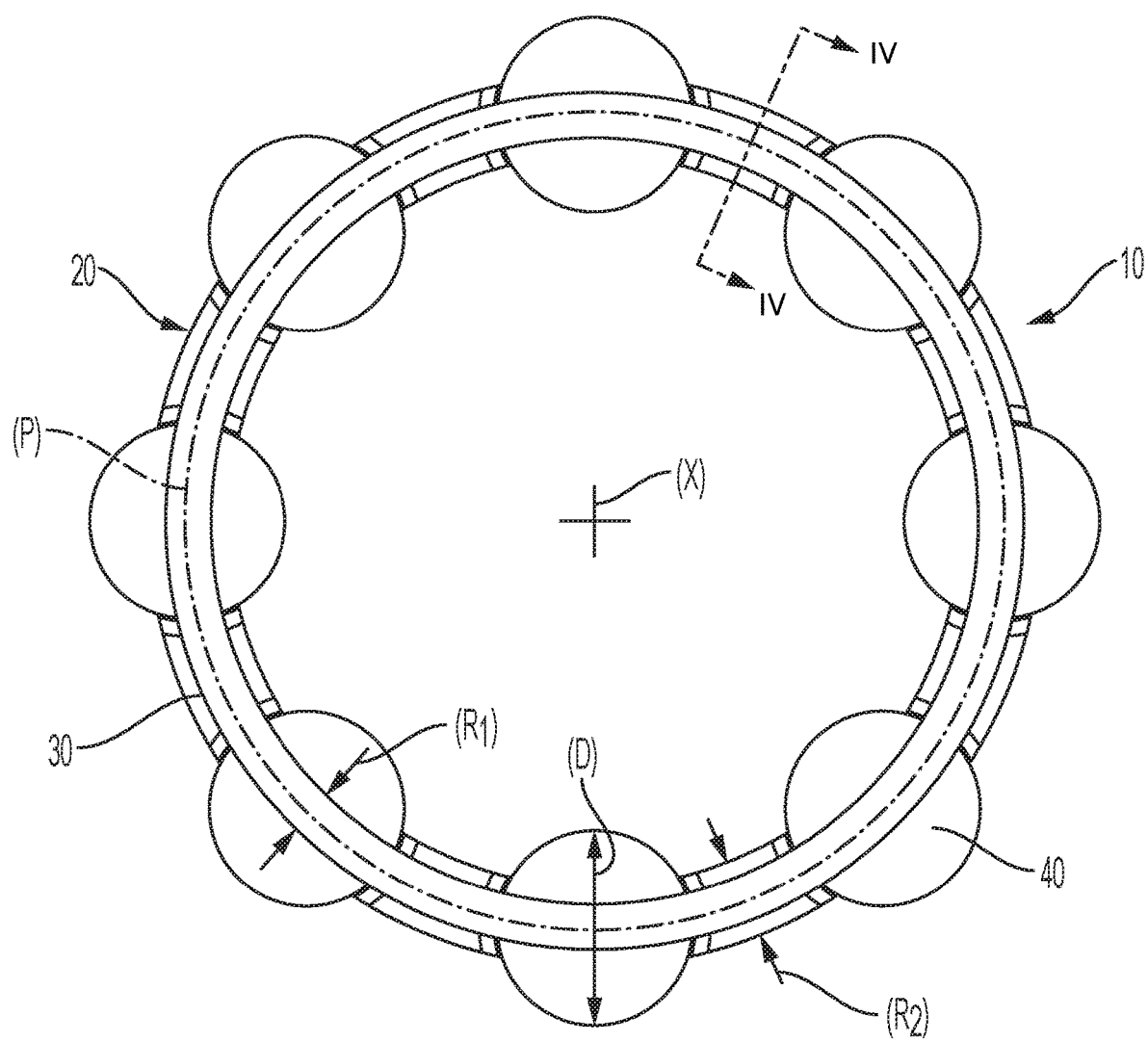
FIG. 3 is a front view of the bearing cage assembly of FIG. 2.

In one embodiment, the slots 23 are defined in a radially medial region of an axial end of the plurality of arms 22. As used herein, the term radially medial region means a region that is spaced between a radially outer surface 24b and radially inner surface 24a of the cage 20, and does not contact the radially outer surface 24b and the radially inner surface 24a. The position of the slots 23 dictates the position of the stiffening ring 30 relative to the rolling elements 40 supported by the cage 20. As shown in FIG. 3, the stiffening ring 30 overlaps with a pitch diameter (P) of the bearing cage assembly 10. In portions of the stiffening ring 30 spaced away from the slots 23, the stiffening ring 30 also partially defines the rolling element pockets 30. In other words, the stiffening ring 30 defines a boundary of the rolling element pockets.

The arms 22 each include a pair of fingers 26a, 26b extending radially towards each other, as shown in FIG. 4. The pair of fingers 26a, 26b each engage the ring 30 to provide the snap fit, and to secure the ring 30 to the cage 20. As shown in FIG. 4, a depth (Z) of the slots 23 is less than 10% of an overall axial extent (Y) of the cage 20. The depth (Z) is selected such that a distance between the rolling element 40 and the ring 30 has a similar amount of clearance as the rolling element 40 and the rolling element pocket 28. In other words, the slots 23 have a minimal depth (Z) relative to the overall size of the cage 20. This feature ensures that the assembly 10 has sufficient overall support and structure to withstand high loads and forces associated with high rotational speeds.

The base rim 24 can also include recesses or recessed portions 27. These recesses 27 can be provided on the radially inner surface 24a and the radially outer surface 24b of the cage 20. In one embodiment, the recesses 27 extend from an axial end of the cage 20 opposite from the slots 23. In one embodiment, the recesses 27 have a rectangular profile. The recesses 27 extend in an axial direction to a medial region of the rolling element pockets 28. The recesses 27 help reduce an overall weight of the assembly 10.

In one embodiment, the stiffening ring 30 has a radial extent ($R_1$), and each rolling element of the plurality of rolling elements 40 have a diameter (D), and the radial extent ($R_1$) of the stiffening ring 30 is less than 50% of the diameter (D) of the plurality of rolling elements. As shown in FIG. 3, the cage 20 has a radial extent ($R_2$), and the radial extent ($R_1$) of the stiffening ring 30 is less than 50% of the radial extent ($R_2$) of the cage 20. In another embodiment, the radial extent ($R_1$) of the stiffening ring 30 is less than 75% of the radial extent ($R_2$) of the cage 20. By limiting the radial extent of the cage 20 and the stiffening ring 30, the assembly 10 has a relatively lower overall mass, and is more suitable for use in high speed applications. The cage assembly 10 disclosed herein provides improved strength during high speed applications while also maintaining a relatively lower overall mass.

In one embodiment, there are eight arms 22 spaced circumferentially around the cage 20. One of ordinary skill in the art would understand that the number of arms can vary.

Although the assembly 10 disclosed herein is used in conjunction with ball bearings, one of ordinary skill in the art would understand that the assembly 10 can be adjusted to be used for cylindrical rollers or any other type of rolling element based on this disclosure.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS bearing cage assembly 10
cage 20
arms 22
slot 23
base rim 24
radially inner surface 24a
radially outer surface 24b
axially outermost end face 25
fingers 26a, 26b
recesses 27
stiffening ring 30
rolling elements 40

What is claimed is:

1. A bearing cage assembly comprising:
   a stiffening ring formed from a first material; and
   a cage formed from a second material that is different than the first material, the cage including a plurality of arms extending axially away from a base rim, the plurality of arms defining a plurality of rolling element pockets therebetween, each arm of the plurality of arms defining a slot dimensioned to receive a portion of the stiffening ring, such that the stiffening ring is secured to the cage via engagement within the slots of the plurality of arms,
   wherein the slots are defined on an axially outermost end face of the plurality of arms, and the stiffening ring is arranged axially inward from the axially outermost end face of the plurality of arms.

2. The bearing cage assembly of claim 1, wherein the stiffening ring is held by the cage axially inside of the axially outermost end face of the plurality of arms.

3. The bearing cage assembly of claim 1, wherein the slots are defined in a radially medial region of an axial end of the plurality of arms.

4. The bearing cage assembly of claim 1, wherein the stiffening ring overlaps with a pitch diameter of the bearing cage assembly.

5. The bearing cage assembly of claim 1, wherein the stiffening ring partially defines the plurality of rolling element pockets.

6. The bearing cage assembly of claim 1, wherein the stiffening ring is secured to the slots of the plurality of arms via a snap fit.

7. The bearing cage assembly of claim 6, wherein the plurality of arms each include a pair of fingers extending radially towards each other, the pair of fingers each engaging the stiffening ring to provide the snap fit.

8. The bearing cage assembly of claim 1, wherein the stiffening ring has a uniformly flat profile.

9. The bearing cage assembly of claim 1, wherein the stiffening ring is formed from metal.

10. The bearing cage assembly of claim 1, wherein the cage is formed from plastic.

11. The bearing cage assembly of claim 1, wherein the base rim includes recesses on a radially inner surface and a radially outer surface of the cage.

12. The bearing cage assembly of claim 11, wherein the recesses extend from an axial end of the cage opposite from the slots.

13. The bearing cage assembly of claim 1, further comprising a plurality of rolling elements supported within the plurality of rolling element pockets, wherein the stiffening ring has a radial extent, and each rolling element of the plurality of rolling elements have a diameter, and the radial extent of the stiffening ring is less than 50% of the diameter of the plurality of rolling elements.

14. The bearing cage assembly of claim 1, wherein the plurality of arms includes at least eight arms.

15. A plastic bearing cage comprising:
a plurality of arms extending axially away from a base rim, the plurality of arms defining a plurality of rolling element pockets therebetween,
a plurality of slots defined on axially outermost ends of respective arms of the plurality of arms, the cage including a plurality of radially extending fingers to partially define the plurality of slots, wherein each slot of the plurality of slots is dimensioned to receive a stiffening ring such that the stiffening ring is captively secured by the cage via the plurality of fingers and the stiffening ring is arranged axially inward from the axially outermost ends of the plurality of arms.

16. The cage of claim 15, wherein the base rim includes recesses on a radially inner surface and a radially outer surface of the cage.

17. The cage of claim 15, wherein the plurality of arms includes at least eight arms.

* * * * *